United States Patent
Gaspari et al.

(10) Patent No.: US 11,308,381 B2
(45) Date of Patent: Apr. 19, 2022

(54) METHOD FOR PRODUCING A RADIOFREQUENCY DEVICE PASSIVE WIRE ANTENNA

(71) Applicant: THALES DIS FRANCE SAS, Meudon (FR)

(72) Inventors: Sebastien Gaspari, Gemenos (FR); Yves Cuny, Gemenos (FR); Brigitte Lacaze, Gemenos (FR); Frédérick Seban, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 153 days.

(21) Appl. No.: 15/555,209

(22) PCT Filed: Feb. 11, 2016

(86) PCT No.: PCT/EP2016/052931
§ 371 (c)(1),
(2) Date: Sep. 1, 2017

(87) PCT Pub. No.: WO2016/139041
PCT Pub. Date: Sep. 9, 2016

(65) Prior Publication Data
US 2018/0053083 A1    Feb. 22, 2018

(30) Foreign Application Priority Data

Mar. 2, 2015   (EP) .................................... 15305315

(51) Int. Cl.
*G06K 19/077*    (2006.01)
*H01Q 1/22*      (2006.01)

(52) U.S. Cl.
CPC ... *G06K 19/0775* (2013.01); *G06K 19/07786* (2013.01); *G06K 19/07794* (2013.01); *H01Q 1/2283* (2013.01)

(58) Field of Classification Search
CPC ......... G06K 19/0775; G06K 19/07786; G06K 19/07794; H01Q 1/2283
(Continued)

(56) References Cited

U.S. PATENT DOCUMENTS 5,552,790 A * 9/1996 Gunnarsson .......... G01S 13/767
                                                    342/51
5,661,901 A * 9/1997 King ................... H01L 25/0657
                                                    257/700
(Continued)

FOREIGN PATENT DOCUMENTS

WO    WO 2014/006300 A1    1/2014
WO    WO 2014/206579 A1    12/2014

OTHER PUBLICATIONS

International Search Report (PCT/ISA/210) dated Apr. 29, 2016, by the European Patent Office as the International Searching Authority for International Application No. PCT/EP2016/052931.
(Continued)

*Primary Examiner* — Bo Fan
(74) *Attorney, Agent, or Firm* — Marc Boillot; Thales DIS CPL USA, Inc

(57) ABSTRACT

A method for producing a radiofrequency device having a first antenna circuit connected to a radiofrequency chip and a second antenna circuit associated with, or coupled to, the first circuit, the method including the following steps: formation of the first antenna circuit in the form of a conductive wire deposited in a guided manner on a first substrate; and formation of the second antenna circuit in the form of a conductive wire deposited on the same first substrate in a guided manner and at a calibrated distance from the first antenna circuit.

16 Claims, 3 Drawing Sheets

(58) Field of Classification Search
USPC ................................................ 342/175, 142
See application file for complete search history.

(56) References Cited

U.S. PATENT DOCUMENTS

| | | | | |
|---|---|---|---|---|
| 6,459,588 | B1* | 10/2002 | Morizumi | G06K 19/07749 |
| | | | | 235/492 |
| 2009/0134504 | A1* | 5/2009 | Lee | H01L 21/565 |
| | | | | 257/680 |
| 2009/0283595 | A1* | 11/2009 | White | A61B 90/90 |
| | | | | 235/385 |
| 2011/0316734 | A1* | 12/2011 | Svensson | H01Q 9/28 |
| | | | | 342/175 |
| 2012/0194377 | A1* | 8/2012 | Yukumatsu | H01Q 9/285 |
| | | | | 342/70 |
| 2013/0147657 | A1* | 6/2013 | Lee | G01S 7/032 |
| | | | | 342/175 |
| 2015/0154491 | A1* | 6/2015 | Charrat | G06K 19/07745 |
| | | | | 235/492 |

OTHER PUBLICATIONS

Written Opinion (PCT/ISA/237) dated Apr. 29, 2016, by the European Patent Office as the International Searching Authority for International Application No. PCT/EP2016/052931.

* cited by examiner

METHOD FOR PRODUCING A RADIOFREQUENCY DEVICE PASSIVE WIRE ANTENNA

The invention relates to a method for producing a radiofrequency device comprising a first antenna circuit connected to a radiofrequency chip and a second antenna circuit associated with/coupled to the first circuit. It also relates to the device thus obtained.

More specifically, the invention relates to devices such as supports for contactless chip carriers, contactless chip cards, electronic identification tags (RFID), contactless electronic passports, devices with a passive antenna or a relay antenna. The invention specifically relates to electronic contactless travel documents (e-passports and e-visas), credit cards or any other contactless product.

These devices can meet the specifications of the ICAO (the acronym for "International Civil Aviation Organization") and/or ISO/IEC 14443 standard. They can operate in different frequency ranges more particularly UHF—between 860 and 960 Mhz or ISO/IEC 14443 standard at 13.56 Mhz.

Radiofrequency devices may include a passive antenna associated with a radiofrequency transponder in order to increase the communication range. In the UHF field, the range can cover several meters for communicating data with a radiofrequency reader.

The inventors have known a UHF radiofrequency device comprising a passive antenna formed on a first substrate by etching while the radiofrequency transponder (comprising the chip connected to an antenna) is formed on a separate second substrate using the wire technology. The two substrates are then assembled by lamination.

The inventors have noted that problems would arise in the reproducibility of communication performances, specifically the range, as well as production problems. The two substrates mentioned above are not stable as regards the positioning thereof relative to each other (the position of one relative to the other cannot be reproduced and causes significant variations in the frequency and thus in the range).

The invention aims at remedying the above-mentioned drawback.

In particular, the invention aims at improving the reproducibility of the positioning of a first antenna circuit (of the transponder) relative to a second (passive) antenna so as to improve the range and thus simplify the production.

The invention provides for a simple, easily implemented method of production.

The invention proposes in principle, in a preferred embodiment, to produce the antennas on the same (single-layer or multilayer) substrate using the wire technology. The chip is preferably connected as a flip chip to a wire antenna through interconnection pads provided on portions or alternations of electrical conductive wires.

For this purpose, the invention relates to a method for producing a radiofrequency device comprising a first antenna circuit connected to a radiofrequency chip and a second antenna circuit associated with/coupled to the first circuit, characterized in that it comprises the following steps:
formation of the first antenna circuit in the form of a conductive wire deposited in a guided manner on a first substrate,
formation of the second antenna circuit 9 in the form of a conductive wire deposited in a guided manner at a calibrated distance from the first antenna circuit.

The invention thus makes it possible to produce the two antennas using the wire technique, while indicating precisely the mutual arrangement thereof.

The inventors have found that range disparities in the same batch of radiofrequency transponders were caused by layout disparities between the two antennas. Such disparities appear to result from ambiguities as regards the positioning of the two antennas upon transferring one antenna circuit substrate onto the other.

Such variations in the relative positioning of the antennas can also be explained by the lamination of the two antenna circuit substrates produced independently of each other, especially when the materials of the assembled substrates and the antenna production technology are different.

The provisions of the invention make it possible to gain reliability and reproducibility by avoiding the aforementioned variations.

The two antennas are produced with great accuracy, in a guided manner, on the same substrate (or a multilayer substrate, with bonded sheets). The arrangement of the two antennas relative to one another remains unchanged during production.

The method includes other steps:
the second antenna circuit is deposited onto the same first substrate or the other substrate pre-positioned relative to the first substrate prior to the formation of the antenna circuit substrate.
the first circuit comprises terminal portions for the interconnection with the radiofrequency chip in the form of alternations;
the portions of wire are deposited onto a substrate using embroidery or overlay;
the second circuit is a passive antenna coupled with the radiofrequency transponder;
the method comprises a step of depositing an anisotropic conductive material onto each terminal portion of the first antenna circuit and a step of transferring and connecting a/an coated/encapsulated chip via such anisotropic conductive material;
the method comprises a step of depositing a conductive material by printing, specifically screen printing, onto each terminal portion of the first antenna circuit and a step of transferring and connecting an unpackaged chip via such conductive material;
the method includes a step of coating/encapsulating the chip in a package, except for the studs thereof, prior to the transfer thereof against the connection terminal portions.

The invention also relates to a radiofrequency device corresponding to the aforementioned method.

More particularly, the radiofrequency device comprises:
a first antenna circuit in the form of a conductive wire positioned on a first substrate.
a second antenna circuit in the form of a conductive wire positioned on the same first substrate and at a calibrated distance from the first antenna circuit.

DESCRIPTION

Figure 1:
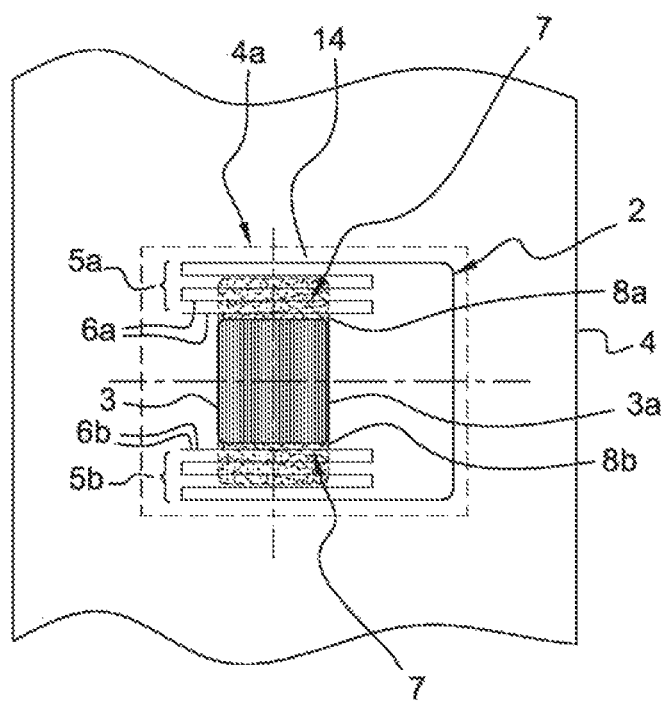
FIG. 1 shows a radiofrequency transponder with a first antenna according to a first embodiment of the method of the invention.

FIG. 1 shows a first embodiment of the method for producing a radiofrequency device according to the method of the invention. According to said method, the device comprises a first antenna circuit 2 connected to a radiofrequency chip 3 and a second antenna circuit associated with/coupled to a first circuit and the forming of the radiofrequency transponder with a first antenna.

According to this first embodiment, the method of the invention includes forming a first antenna circuit 2 in the form of a conductive wire.

In the example shown in FIG. 1, the wire is preferably deposited in a guided manner onto a first substrate 4. Among the known and preferred methods, the wire is deposited and fixed on the substrate by ultrasonic overlay. The conductive wire may also be deposited using embroidery or sewing techniques. Such techniques make it possible to precisely transfer and guide the wire deposited onto a substrate.

For instance, the accuracy tolerance for the positioning of the wire may be less than 0.05 mm as regards the wire overlay.

The substrate used is specifically made of plastic (PET, PU, PVC, PC, Paper, Teslin®) for the overlay. It can be made of (or include) woven or nonwoven fabric, preferably coated/impregnated/covered with a material improving the mechanical strength of the fabric for embroidery or sewing.

According to one characteristic of the invention, the first circuit 1 comprises terminal portions 5a, 5b for interconnection to the radiofrequency chip in the form of alternations 6a, 6b.

In the example, the antenna comprises forming at least one closed loop with a turn and alternations or zigzags 6a, 6b as terminal portions 5a, 5b of the loop. The portions of the loop are substantially straight and the loop has the general shape of a "U".

According to one characteristic of this first embodiment, the method provides for a step of depositing an anisotropic conductive material 7 onto each terminal portion of the first antenna circuit.

In the example, an anisotropic film 7 covering both terminal portions or alternations 6a, 6b is deposited so as to cover at least one or preferably several alternation(s) of each interconnection terminal portion 5a, 5b.

Alternately, an anisotropic material can be deposited in the form of a paste (ACP).

Then, according to another characteristic of this embodiment, the invention provides for a step of transferring and connecting a chip coated/encapsulated in an encapsulating material 3a. Connection is provided via such anisotropic conductive material 7. Encapsulation/coating/overmolding with plastic (e.g. epoxy resin or thermosetting resin) is preferred to enable chips having a greater functional capacity (memory, performance) and larger dimensions than UHF chips. The chips according to the invention typically have an area greater than 0.3×0.3 mm² or even than 0.5×0.5 mm².

The module preferably comprises interconnection pads 8a, 8b connecting the radiofrequency communication studs of the chip, so as to provide a larger area for the interconnection or ohmic connection with the wire alternations. In the examples, modules of the MCC8 or mob4 types, respectively by the Infineon or NXP companies, can be used. This mode is preferred with such a module packaging for chips particularly of the UHF type, when such chips are larger mainly because of a greater capacity or a better functionality.

A connection in the form of a flip chip is less desired because chips with larger dimensions are more fragile.

Where appropriate, a capacitive connection between the module and the terminal portions can be achieved. The terminal portions can be coated with a conductive, in particular printed, material 17a, 17b (not shown in FIG. 1 instead of the material 7 but in FIG. 3) and an insulator can be placed between the pads 8a, 8b of the module to be inserted between the pads 17a, 17b and the pads 8a, 8b.

Alternately, with chips packaged as a module as mentioned above, the invention may provide to connect, by welding, the terminal wire portions of the first antenna circuit with the interconnection pads of these modules. The module may have been transferred on the sheet 4 beforehand or after the production of the antenna.

The chip packaging 3a makes it possible to transfer and to fix the chip under pressure without risk of damage thereto. Besides, the chip is protected for the subsequent operations of lamination or simply use. It can also be transferred, connected and fixed by gluing as a flip chip.

The transponder thus formed has a frequency response with a value greater than or equal to the target frequency and the secondary antenna (the second antenna circuit) 9 which will preferably bring the resulting frequency of the assembly back to a target or desired frequency value. In the example, the second antenna circuit 9 (the secondary antenna) is calculated so as to reduce the overall frequency to a desired use in UHF between 860 and 960 MHz, and the first antenna circuit 2, 22 (the primary antenna) of the transponder can range from 800 to 1,500 MHz.

According to another characteristic, the invention provides, in the first mode, to form the second antenna circuit 9 also in the form of a conductive wire and on the same substrate 4 as previously. Such second antenna circuit 9 makes it possible to increase the range of the radiofrequency transponder.

Alternately, the substrate 4 can consist of two or more layers or sheets and preferably with at least one opening for receiving the chip and/or the first circuit.

Figure 2:
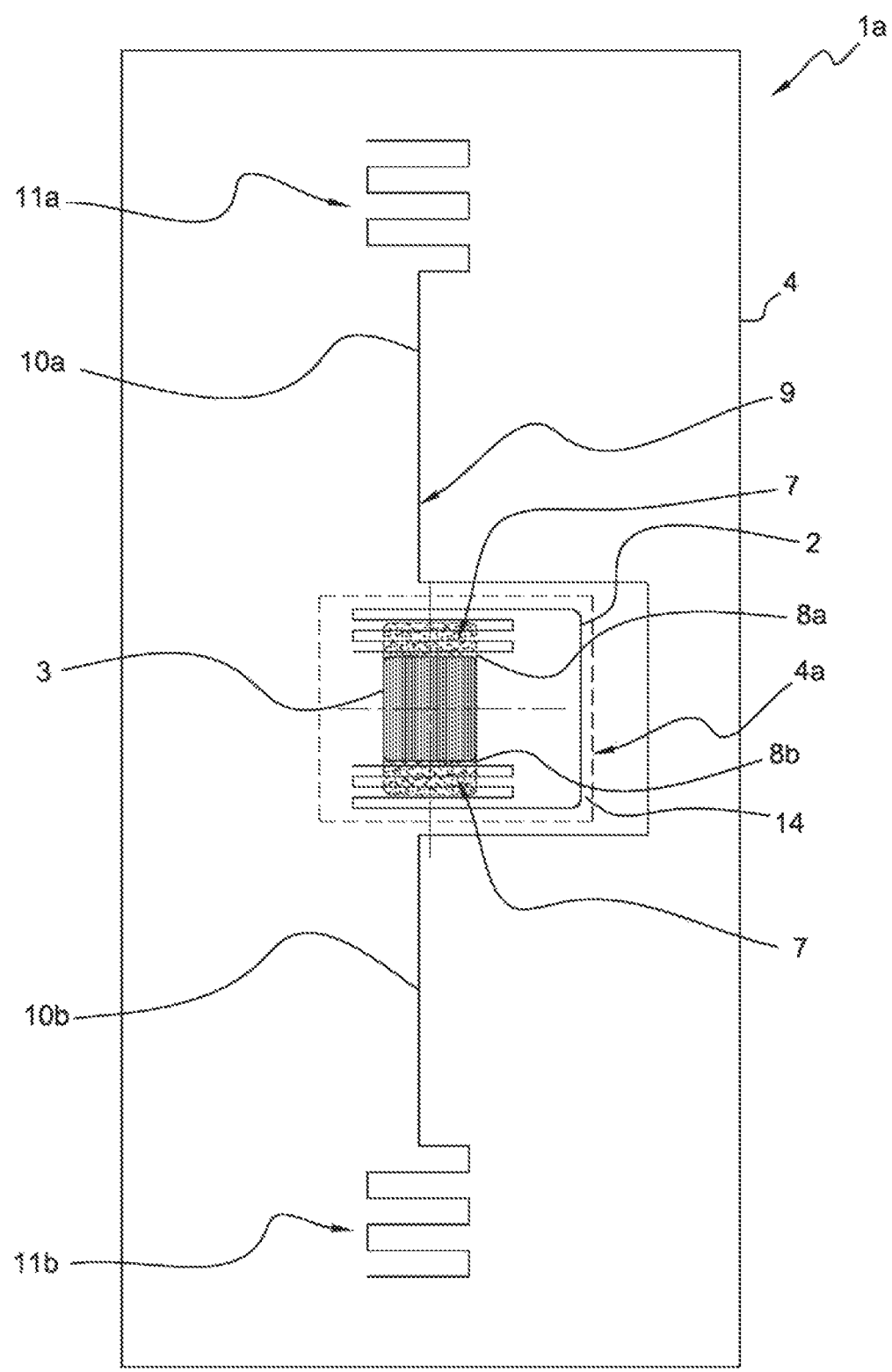
FIG. 2 shows a step of associating the second antenna according to the first embodiment of the method of the invention.

In the example, this step is illustrated in FIG. 2.

The second antenna 4 is here a passive antenna which is positioned at a calibrated distance (A, B, C) from the first antenna circuit 2. An overlaid wire deposition technique is preferably used as mentioned above. Other guided wire or accurate deposition of antenna track techniques known to those skilled in the art, can however be envisaged.

The second antenna also has the shape of a "U" which surrounds/caps the "U"-shaped part of the first antenna 2 and at a distance therefrom.

The second antenna 9 comprises straight branches 10a, 10b which extend from the top branches of the "U" in directions opposite the module.

The branches have terminations 11a, 11b in the form of alternations or zigzags.

The lateral deviations A and C and the cross deviation B of the second antenna circuit relative to the first antenna circuit are fully controlled using the wire overlay technique.

Figure 3:
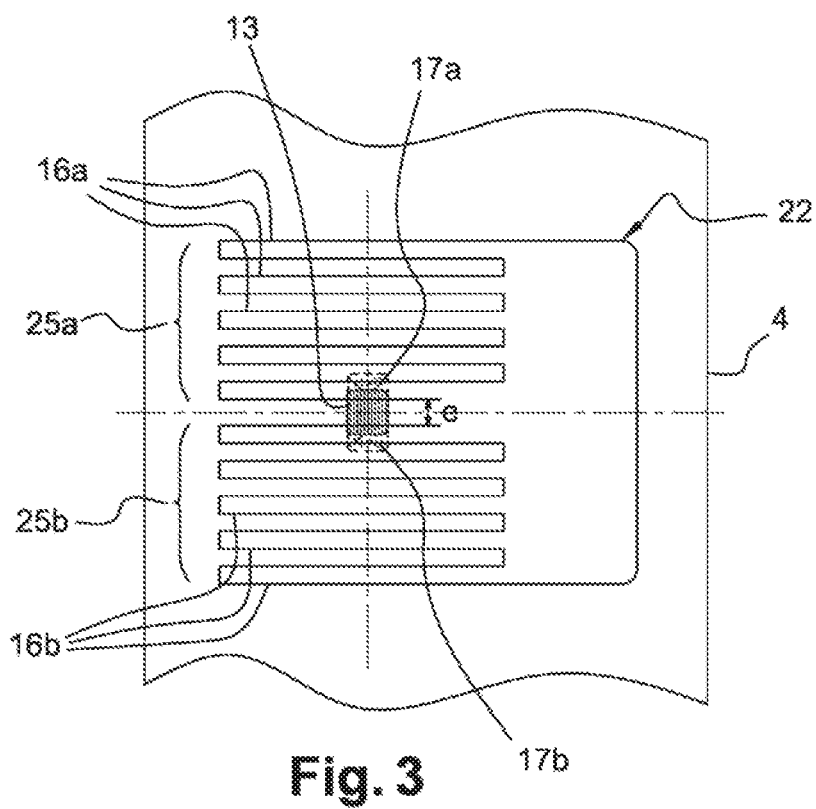
FIG. 3 shows a formation of the radiofrequency transponder with a first antenna according to a second embodiment of the method of the invention.

FIG. 3 shows a second embodiment of the method of the invention.

The first antenna 22 is formed substantially as mentioned above, but with more alternations 25a, 25b inside the "U".

The space "e" between the last alternations substantially corresponds to half the width of an unpacked chip 13.

Such an antenna arrangement is intended to receive an unpacked chip with small dimensions like those of normal UHF chips of the order of 0.3×0.3 mm.

According to one characteristic of this second embodiment, the method comprises a step of depositing conductive material 17a, 17b by printing, including screen printing, onto each terminal portion 25a, 25b of the first antenna circuit and a step of transferring and connecting an unpacked chip 13 via such conductive material.

In the example shown in FIG. 3, two distinct interconnection areas or pads 17a, 17b of conductive material at least partly covering one or two terminal alternation(s) of the conductive wire 16a, 16b are deposited by screen printing. These interconnection areas 17a, 17b provide pads for receiving a chip.

Alternately, a jet of conductive material or a jet of conductive ink can be used for printing.

The chip can be transferred prior to complete drying (or coalescence) of the conductive material or evaporation of the solvent, if any.

The chip preferably comprises sharp protruding studs (stud dump) formed on the electrical connection areas of the chip. Such sharp studs preferably get into the printed conductive material to connect the first antenna 22.

Where appropriate, the chip is bonded (or partially embedded in the base) on the printed areas 17a, 17b using a conductive or anisotropic adhesive (not shown).

Figure 4:
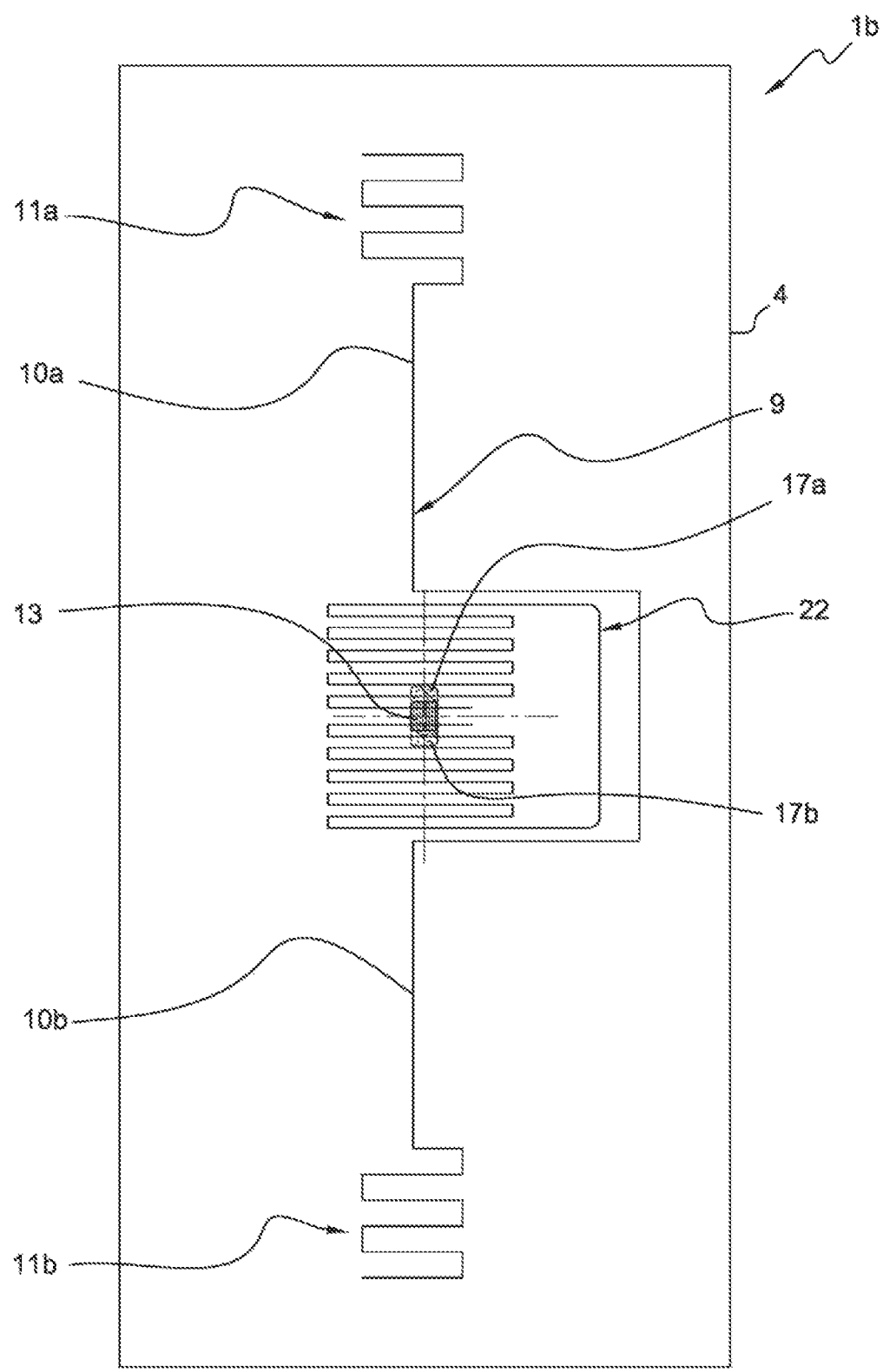
FIG. 4 shows a step of associating the second antenna according to the second embodiment of the method of the invention.

Then FIG. 4 illustrates the step of forming the second passive antenna 19. This step is similar to or identical with the one used to make the passive antenna of FIG. 2. The same numbers refer to identical or similar elements.

As mentioned above, the invention makes it possible to scrupulously comply with the deviations A, B and C affecting the range. 1 to 1.5 millimeter variations can lead to a variation in the range of the transponder communication of up to 1 or 2 m or even a few meters.

Because they are positioned on the same substrate, the two antennas 2, 9 or 22, 9 of each embodiment do not slip (or do not move) relative to each other during lamination.

A better dimensional stability of the antennas relative to each other is obtained as well as a better reproducibility of the radiofrequency communication performances.

The substrate carrying the transponder and the passive antenna form a finished product or an insert (inlay) intended to be inserted into any product covered by the invention or transformed by adding material (a card, a passport, a packaging, clothing, cardboard packing, overmolding . . . ). It can be covered with at least one fibrous coating layer or sheet or a decoration or graphic printing, paper layer. The layer may be deposited by printing, jet of material or lamination.

Where appropriate, the substrate 4 may consist of two substrates bonded together prior to the overlaying of the antennas, 9, 2 or 22: a second substrate carrying the second antenna circuit 9 and a first substrate carrying the first antenna circuit 2, 22 only, so as to reinforce or protect the chip area. The first substrate may be on the surface carrying the second antenna 9 or on the face opposite a cavity 4a provided in the second substrate (FIG. 2).

The first substrate carrying the first antenna circuit 2, 22 may be recessed relative to the second substrate so that the first antenna circuit is positioned substantially within the cavity/opening 4a and may, if necessary, reinforce or protect the area of the chip more specially through the cavity itself or through a protective material, i.e. resin, glue at least partially filling the cavity.

Where appropriate, the invention provides a recess or an opening in the substrate 4 for receiving at least the coating of the chip or even the whole first circuit 2, 3, 8a, 8b.

The cavity may be formed by superimposing a solid support sheet and a sheet having an opening or a window located at the module or the radiofrequency transponder formed by the first antenna circuit and the module 3, 3a. The whole transponder circuit can thus be protected by a cavity or a shoulder. The opening can then be filled with a coated or sprayed liquid adhesive material. Such adhesive material can be used to fix another covering or finish sheet.

Optionally, in an alternative solution, the area comprising the first circuit 2 can be stamped, thinned to form an at least partial cavity at the module or at the antenna 2.

Such cavity can be filled with glue and/or air while being closed by a covering film/protection for the whole assembly.

Thus, according to one characteristic of the invention, the method may comprise a step of forming at least a part of the first circuit or of fixing the integrated circuit chip 2 in a cavity or an opening 4a formed in one of the substrates 4, 14.

The invention thus makes it possible to simply produce a radiofrequency transponder device with a high-powered reproducible range, with dimensional stability between the antennas and functional stability of the transponder thanks to a protection of the first circuit 2, 3 or 22, 13.

Subsequent laminations of the inlay with other sheets do not cause sliding/moving of the antennas relative to one another.

The first antenna circuit 2, 22 (also called the first or primary antenna) of the transponder has a size of about 8×8 mm to 12×12 mm.

The second antenna circuit 9 (also called the second or secondary antenna) uses the entire available surface of the substrate and may in particular extend lengthwise on the whole length of a substrate to the chip card format.

Other formats of both antenna circuits are possible according to the applications.

The invention claimed is:

1. A method for producing a radiofrequency device comprising a first antenna circuit connected to a radiofrequency chip, and a second antenna circuit disposed at a distance from the first antenna circuit at which the second antenna circuit increases a communication range of the radiofrequency device,
comprising the following steps:
forming the first antenna circuit by depositing a conductive wire onto a first substrate, and
after forming the first antenna circuit, forming the second antenna circuit by depositing a conductive wire onto the first substrate and at the distance from the first antenna circuit, wherein the method results in the final product in the fabrication flow.

2. A method according to claim 1, wherein the first circuit includes terminal portions for interconnection to the radiofrequency chip in the form of alternations.

3. A method according to claim 1, wherein portions of wire of the antenna circuit are deposited onto a substrate using embroidery or overlay.

4. A method according to claim 1, wherein the second circuit is a passive antenna coupled with a radiofrequency transponder.

5. A method according to claim 1, further comprising a step of depositing an anisotropic conductive material onto each terminal portion of the first antenna circuit and a step of transferring and connecting a/an coated/encapsulated chip via said anisotropic conductive material.

6. A method according to claim 1, further comprising a step of depositing a conductive material by printing, specifically screen printing, onto each terminal portion of the first antenna circuit and a step of transferring and connecting an unpackaged chip via said conductive material.

7. A method according to claim 1, further comprising a step of coating/encapsulating the chip in a package, except for the studs thereof, prior to the transfer thereof against connection terminal portions.

8. A method according to claim 1, further comprising at least a step of forming a part of the first circuit or fixing the radiofrequency chip in a cavity or an opening—provided in one of the substrates.

9. A method for producing a radiofrequency device comprising a first antenna circuit connected to a radiofrequency chip, and a second antenna circuit disposed at a distance from the first antenna circuit at which the second antenna circuit increases a communication range of the radiofrequency device,
comprising the following steps:
forming the first antenna circuit by depositing a conductive wire onto a first substrate, and
after forming the first antenna circuit, forming the second antenna circuit by depositing a conductive wire onto a second substrate and at the distance from the first antenna circuit,
wherein the method results in the final product in the fabrication flow.

10. A method according to claim 9, wherein the first circuit includes terminal portions for interconnection to the radiofrequency chip in the form of alternations.

11. A method according to claim 9, wherein portions of wire of the antenna circuit are deposited onto a substrate using embroidery or overlay.

12. A method according to claim 9, wherein the second circuit is a passive antenna coupled with a radiofrequency transponder.

13. A method according to claim 9, further comprising a step of depositing an anisotropic conductive material onto each terminal portion of the first antenna circuit and a step of transferring and connecting a/an coated/encapsulated chip via said anisotropic conductive material.

14. A method according to claim 9, further comprising a step of depositing a conductive material by printing, specifically screen printing, onto each terminal portion of the first antenna circuit and a step of transferring and connecting an unpackaged chip via said conductive material.

15. A method according to claim 9, further comprising a step of coating/encapsulating the chip in a package, except for the studs thereof, prior to the transfer thereof against connection terminal portions.

16. A method according to claim 9, further comprising at least a step of forming a part of the first circuit or fixing the radiofrequency chip in a cavity or an opening provided in one of the substrates.

* * * * *